UNITED STATES PATENT OFFICE.

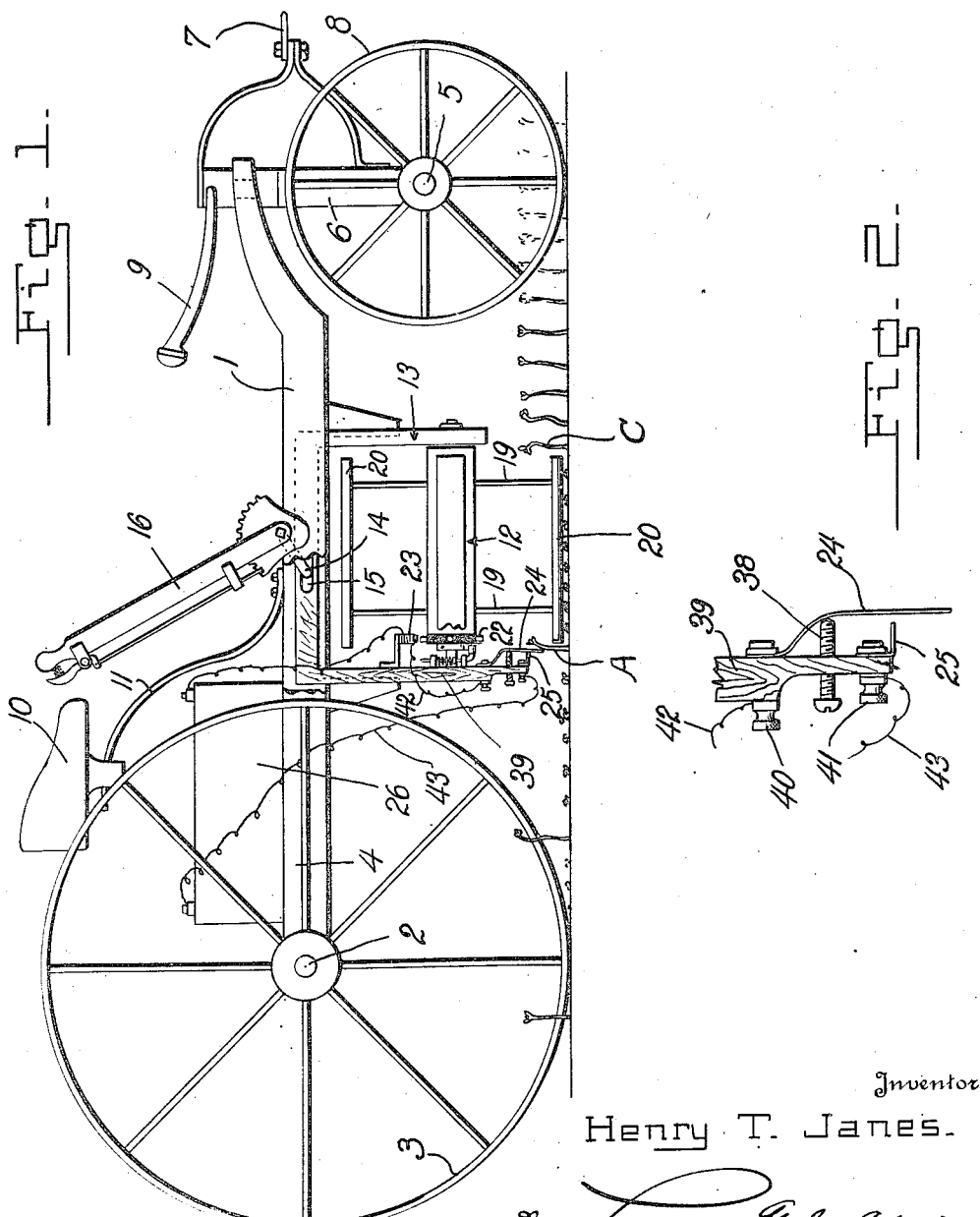

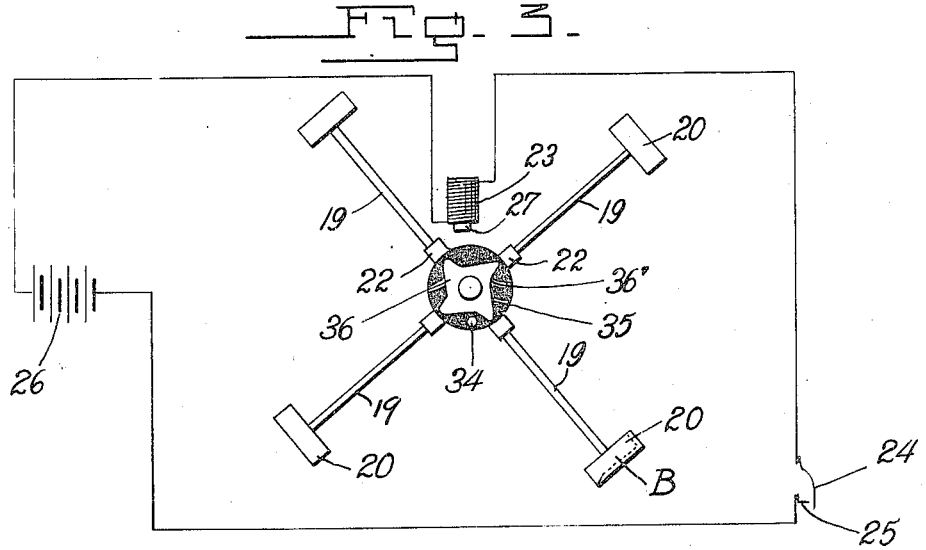
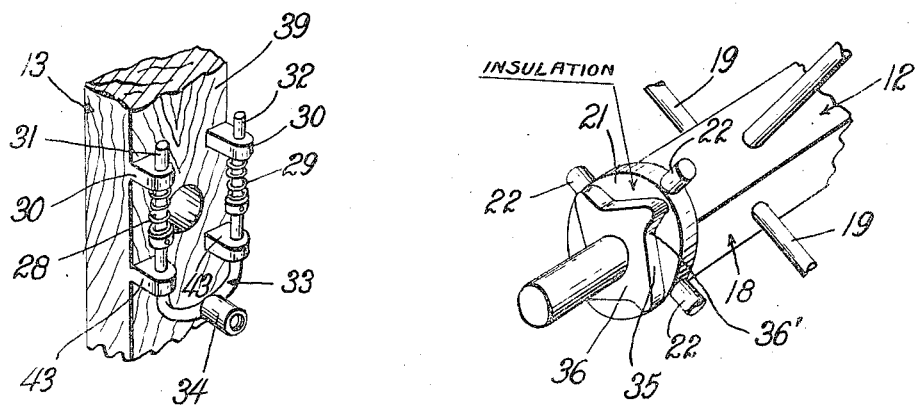

HENRY T. JANES, OF ABBOTT, TEXAS.

COTTON-CHOPPER.

1,303,798.          Specification of Letters Patent.          Patented May 13, 1919.

Application filed October 7, 1918. Serial No. 257,163.

*To all whom it may concern:*

Be it known that I, HENRY T. JANES, a citizen of the United States, and a resident of Abbott, in the county of Hill and State of Texas, have invented certain new and useful Improvements in Cotton-Choppers, of which the following is a specification.

This invention relates to cotton choppers, and an object of the invention is to provide a cotton chopper including a chopping element which is normally stationary and is operated automatically, or electrically, at regular intervals for chopping out cotton plants.

More specifically, an object of the invention is to provide in a cotton chopping machine, a chopping element which is movable for cutting out the cotton plants through given spaces and which is normally held stationary, or against rotation, being operated by the engagement of a control means with a cotton plant for operating the chopper to move a cutting blade or hoe thereof across the rows of growing plants, equally spacing the plants which are left in the field, and means for arresting movement of the chopper after a blade thereof has moved across the row until the entire cotton chopping machine moves forward over the space from which the plants have been cut and the control means is again engaged by the plant which was left directly in front of the forward edge of the cutting blade, at which time the chopper will again be operated, cutting the plant forwardly of the plant engaging the control means, for the length of a blade of the chopping element.

Other objects of the invention will appear in the following detailed description, taken in connection with the accompanying drawings, forming a part of this specification, and in which drawings:

Figure 1 is a side elevation of the improved cotton chopper having parts broken away.

Fig. 2 is an enlarged side elevation of the plant operated circuit closer.

Fig. 3 is a diagrammatic view showing the relation of the chopping element and the electric magnet for imparting initial movement to the chopping element and also showing in diagram, the circuit controlling the exciting of the electric magnet.

Fig. 4 is a detail perspective of the spring actuated mechanical means for imparting movement to the chopping element, and Fig. 5 is a detail perspective view of one end of the chopping element.

Referring more particularly to the drawings wherein like characters designate like and corresponding parts, 1 indicates the supporting frame of the cotton chopper as an entirety, which carries a rear axle 2 having the usual type of supporting wheels 3 mounted thereon, a platform 4 and a front axle structure 5 which is connected to the frame 1 for swinging movement about a vertical axis to permit the proper steering of the cotton chopper. The standard 6 which supports the front axle 5 has the draft tree structure 7 connected thereto so as to permit the front wheels 8 to be steered by the draft animals and it also has foot levers 9 connected thereto by means of which the operator of the machine may steer or guide the direction of travel of the cotton chopper with his feet. The usual type of seat 10 is carried by the ordinary type of spring standard 11 which is in turn supported by the supporting frame 1.

The rotary chopping element generically indicated by the numeral 12 is supported by a frame 13 and this frame is in turn supported by a crank shaft 14 which rides in a slot 15 formed in the upper end of the frame 13. A hand lever 16 is mounted upon the crank shaft 14 for rocking this shaft to raise and lower the frame 13 for adjusting the elevation of the rotary cutting element 12.

The rotary cutting element 12 comprising a hub 18 which is substantially rectangular-shaped and has a plurality of arms 19 radiating therefrom and arranged in pairs to the outer ends of which arms are connected the chopping knives or hoes 20. These hoes or knives 20 may be of any approved type, for properly cutting the young cotton plants.

A disk 21 is mounted at one end of the hub 18 and it has a plurality of radiating armatures 22 carried thereby, equal in number to the number of hoes or cutting blades 20 and during the operation of the cotton chopper the cutting element 12 is rotated through the medium of these armatures 22 and an electro-magnet 23.

For instance; during the travel of the cotton chopping machine, the spring circuit closer 24 is engaged by a cotton plant indicated at A and pressed rearwardly into engagement with the stationary contact 25 thus closing a circuit through the batteries 26 which are carried by the platform 4 and through the electro-magnet 23, attracting the armature 22 which is nearest the core of the electro-magnet 23 and rotating the cutting element 12 until the armature 22 contacts with the core 27 of the electro-magnet which movement will move the chopping element indicated by the letter B in Fig. 3 of the drawings, into engagement with the row of cotton plants forwardly of the plant A by which time the plant A will have become disengaged from the spring 24, owing to the forward travel of the cotton chopper, and the circuit will be broken. However the movement of the chopping element 12 will be continued by the contacting action of spiral springs 28 and 29 which are connected to suitable bearings 30 and to the legs 31 and 32 respectively on a yoke 33, drawing this yoke upwardly and causing the pressure roller 34 which is carried by the yoke to ride over the inwardly inclining surface 35 of the cam 36, which is also carried by the hub 18, moving the chopping element 12 into substantially the position shown in Fig. 3 of the drawings and completing the cutting movement of the blade B. When the pressure roller 34 reaches the depression or innermost portion 36' of the side 35 of the cam, it will rest therein and since this depression is to one side of the axis of the hub 18 of the cutting element, one of the armatures 22 will be held nearer the core 27 than the one next thereto and forwardly thereof, thereby causing the cutting element 12 to always rotate in the proper direction for chopping the cotton plant. The chopping element 12 will remain stationary during the forward movement of the cotton shopper until the spring circuit closer 24 is engaged by the cotton plant indicated at C in Fig. 1 of the drawings, at which time the foregoing operation will be repeated; thus, it will be seen that a cotton plant is left standing at each end of the blade 20 of the cutting element, thus spacing the cotton plant the desired distance and by employing chopping blades or hoes of various lengths, the distance between the cotton plant left standing, may be regulated as desired.

The spring circuit closer 24 is of very fine light spring metal so that it may be swung into engagement with the contact 25 by a young cotton plant, and its tension may be regulated by a set screw 38 which is adjustably carried by the lower end of the arm 39 of the supporting frame 13. This arm 39 also carries binding posts 40 and 41 to which the conducting wires 42 and 43 respectively are connected for connection with the movable contact or circuit closer 24 and a stationary contact 25. The yoke 33 is slidably supported by the lugs 30 and also by lugs 43 all of which are carried by the arm 39.

Changes in details may be made without departing from the spirit of this invention; but,

I claim:

1. In a cotton chopper, the combination, of a normally stationary chopping element, normally inactive electrical means for operating said element, means operable upon engagement with a cotton plant to permit exciting of said electrical means for operating said chopping element, and mechanical means for continuing, for a predetermined interval, the operation of said chopping element after said electrical means again becomes inactive.

2. In a cotton chopper, the combination, of a normally stationary chopping element, normally inactive electrical means for operating said element, means operable upon engagement with a cotton plant to permit exciting of said electrical means for operating said chopping element, and spring operated mechanical means for continuing, for a predetermined time, the operation of said chopping element after said electrical means again becomes inactive.

3. In a cotton chopper, the combination, of a normally stationary chopping element, normally inactive electrical means for operating said element, control means for said electrical means operable at intervals when said chopping element has been moved substantially its length along a row of growing plants to permit operation of said electrical means, and mechanical means for continuing, for a predetermined time, the operation of said chopping element after said electrical means again becomes inactive.

4. In a cotton chopper, the combination, of a normally stationary chopping element, electrical means for operating said chopping element, a switch controlling the operation of said electrical means adapted to be operated at intervals when said chopping element has been moved substantially its length along a row of growing plants, and spring operated mechanical means for continuing, for a predetermined interval, the operation of said chopping element, after said electrical means again becomes inactive.

5. In a cotton chopper, the combination, of a normally stationary chopping element, an electrical means for operating said chopping element including an armature carried by the chopping element, and an electro-magnet for co-action with said armature.

6. In a cotton chopper, the combination, of a normally stationary chopping element, electrical means for operating said chopping element including a plurality of spaced armatures carried by said chopping element, an electro-magnet for co-action with said armatures, and a plant operated switch mechanism controlling the passage of a current through said electro-magnet.

7. In a cotton chopper, the combination, of a normally stationary chopping element, an armature carried by said chopping element, an electric magnet for attracting said armature to operate said chopping element, and a switch controlling the exciting of said electric magnet, said switch adapted to be closed at intervals when said chopping element has been moved substantially its length along a row of growing plants.

8. In a cotton chopper, the combination, of a normally stationary chopping element, an armature carried by said chopping element, an electric magnet for attracting said armature to operate said chopping element, a switch controlling the exciting of said electric magnet, said switch adapted to be closed at intervals when said chopping element has been moved substantially its length along a row of growing plants, and mechanical means for continuing movement of said chopping element to move said armature out of operative engagement with said electric magnet.

9. In a cotton chopper, a rotary chopping element, electrical means for imparting an initial rotary movement to said chopping element at predetermined intervals, and mechanical means for continuing, for a predetermined interval, the operation of said chopping element.

10. In a cotton chopper, the combination, of a rotary chopping element, electrical means for imparting an initial rotary movement to the chopping element at predetermined intervals, and mechanical means for continuing, for a predetermined time, the operation of said chopping element including a cam, and a spring controlled pressure roller engaging said cam.

11. In a cotton chopper, the combination, of a rotary chopping element, electrical means for imparting an initial rotary movement to the chopping element at intervals when the chopping element has been moved substantially its length along a row of growing plants, a cam carried by said chopping element, a spring controlled and operated pressing roller engaging the periphery of said cam for continuing a predetermined time, the operation of said chopping element.

12. In a cotton chopper, the combination, of a normally stationary chopping element, an armature carried by said chopping element, and an electric magnet for attracting said armature to operate said chopping element.

13. In a cotton chopper, the combination, of a normally stationary chopping element, an armature carried by said chopping element, an electric magnet for attracting said armature to operate said chopping element, and mechanical means for continuing for a predetermined interval, the operation of said chopping element.

14. In a cotton chopper, the combination, of a normally stationary chopping element, an armature carried by said chopping element, an electric magnet for attracting said armature to operate said chopping element, and a plant operated switch for controlling operation of said magnet.

15. In a cotton chopper, the combination, of a normally stationary chopping element, an armature carried by said chopping element, an electric magnet for attracting said armature to operate said chopping element, a cam carried by said chopping element, and a spring controlled pressure roller engaging said cam for continuing the operation of said chopping element for a predetermined time after the deënergizing of said magnet.

16. In a cotton chopper, the combination, of a normally stationary chopping element, an armature carried by said chopping element, an electric magnet for attracting said armature to operate said chopping element, a cam carried by said chopping element, a spring controlled pressure roller engaging said cam for continuing the operation of said chopping element for a predetermined time after the deënergizing of said magnet, and a switch controlling the exciting of said electric magnet, said switch adapted to be closed at intervals when said chopping element has been moved substantially its length along a row of growing plants.

17. In a cotton chopper, the combination, of a normally stationary chopping element, electrical means for operating said chopping element, a switch controlling the operation of said electrical means and adapted to be operated at intervals when said chopping element has been moved substantially its length along a row of growing plants, a cam carried by said chopping element, a spring controlled and operated pressure roller engaging the periphery of said cam for continuing, a predetermined time, the operation of said chopping element after deënergizing of said electric means.

18. In a cotton chopper, the combination, of a rotary chopping element, means for imparting a rotary movement to said chopping elements including a cam carried by the chopping element, and a spring controlled and operated pressure roller engaging the periphery of said cam.

HENRY T. JANES.